(12) United States Patent
Murray

(10) Patent No.: US 8,746,606 B1
(45) Date of Patent: Jun. 10, 2014

(54) ELECTRICAL CORD ORGANIZATION BOX

(76) Inventor: Secreen Murray, Tampa, FL (US)

( * ) Notice: Subject to any disclaimer, the term of this patent is extended or adjusted under 35 U.S.C. 154(b) by 517 days.

(21) Appl. No.: 13/109,100

(22) Filed: May 17, 2011

(51) Int. Cl.
 *B65H 75/44* (2006.01)
(52) U.S. Cl.
 USPC ..... 242/407; 242/388.6; 242/397; 242/405.1; 242/588.6; 242/594.5; 242/597.5; 242/597.7; 242/613.2; 242/129
(58) Field of Classification Search
 CPC ............................ B65H 75/44; B65H 75/4471
 USPC ................... 242/170, 171, 388, 388.6, 388.9, 242/388.91, 398, 399, 407, 588, 588.3, 242/588.6, 594, 594.5, 597, 597.5, 597.7, 242/613–613.2, 129, 172, 397, 405.1
 See application file for complete search history.

(56) References Cited

U.S. PATENT DOCUMENTS

| RE6,416 | E | * | 5/1875 | Richardson | ................ | 242/597.7 |
|---|---|---|---|---|---|---|
| 3,602,455 | A | | 8/1971 | Lewis | | |
| 4,858,846 | A | | 8/1989 | McDonald | | |
| D376,530 | S | | 12/1996 | Hawthorne | | |
| 5,913,487 | A | | 6/1999 | Leatherman | | |
| 7,038,126 | B2 | | 5/2006 | Solet | | |
| 7,098,406 | B1 | | 8/2006 | Hammonds | | |
| 7,491,903 | B2 | | 2/2009 | Hybiske et al. | | |
| 2010/0163667 | A1 | * | 7/2010 | Dorais et al. | ................... | 242/587 |

* cited by examiner

*Primary Examiner* — William E Dondero

(57) ABSTRACT

The electrical cord organization box includes a lid that secures atop said box. The box includes an array of helical cones that have a curvature ideal for winding and unwinding cables or wires thereon, which prevents unwanted tangling or slipping. The box includes along the front surface and the rear surface a plurality of slots that are aligned adjacent each helical cone, and which have a curvature that secures the respective wire or cable to the surface of the box. The box is placed adjacent a plurality of electrical devices so as to provide a means to organize and store excess cable or wire lengths associated with the electrical devices.

4 Claims, 4 Drawing Sheets

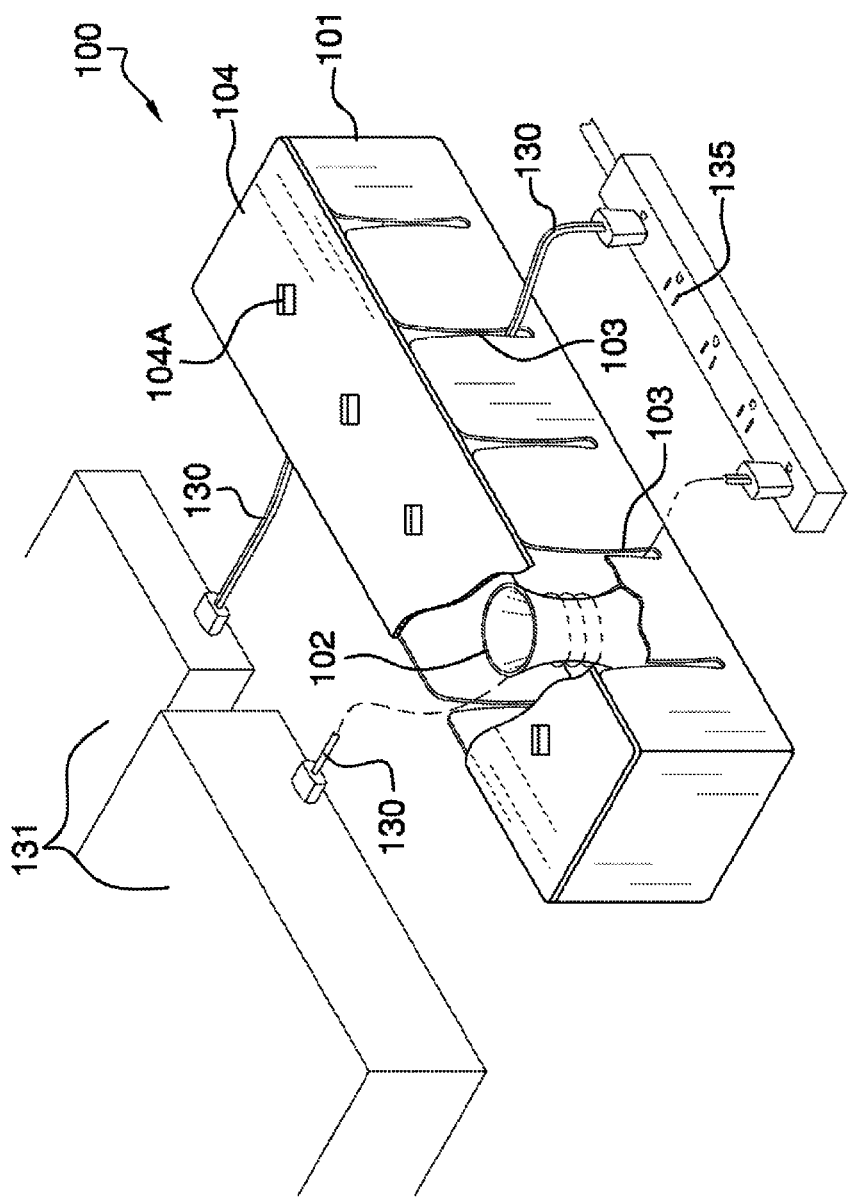

ELECTRICAL CORD ORGANIZATION BOX

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of electrical cord organizers, more specifically, a box that can store and organize a plurality of electrical cords.

B. Discussion of the Prior Art

As will be discussed immediately below, no prior art discloses a box that includes an array of helical cones that enable wires and cables to be manually wound or unwound in order to store and organize excess cable or wire length; wherein the box includes slits aligned along a front and rear surface that are adjacent each helical cone; wherein the slits have a curvature that enables a wire or cable to be, locked to said surface; wherein the lid includes a plurality of locking tabs for securement atop said box; wherein the lid includes a plurality of openings aligned above the helical cones, which enables viewing therein; wherein the shape of the helical cones enables each wire or cable to be wind therein without slipping or tangling; and wherein the box is placed adjacent a plurality of electrical devices so as to provide a means of storing and organizing a plurality of cables and wires having excess lengths.

The Hybiske et al. Patent (U.S. Pat. No. 7,491,903) discloses a cable organizer that includes a cable spool that is mountable to an underside of a support surface and is used to organize, store, and separate cables and power cables used to operate and power electrical appliances. However, the organizer is not a box that encloses a plurality of conical towers that are used to organize individual cables and wires within and adjacent electrical devices.

The Lewis Patent (U.S. Pat. No. 3,602,455) discloses a wire dispenser. Again, the dispenser dispenses a wire there from, and is not a box capable of storing a plurality of cables and wires upon helical towers located within said box.

The Solet Patent (U.S. Pat. No. 7,038,126) discloses a substantially rectangular storage container for organizing electronic equipment and cables. However, the storage container does not include an array of helical cones that are used to manually wind cables and wires around and which when enclosed inside of a box neatly stores and organizes said cables and wires.

The McDonald Patent (U.S. Pat. No. 4,858,846) discloses an audio wiring harness apparatus set forth to remove slack from existing coaxial-type cable utilized in the electrical association of various electronic components. However, the apparatus does not teach a box containing an array of helical cones that can be used to manually wind cables and/or wires thereon so as to store and organize said cable and/or wire adjacent a plurality of electrical devices.

The Hammonds Patent (U.S. Pat. No. 7,098,406) discloses a versatile modular device for organizing, shortening, and securing a plurality of cords such as cables, having a simple design that permits easy removal or addition of cords and a straightforward method for wrapping and securing an indiciaul cord to a desired length. However, the device does not use helical cones that wind a cord or wire thereon.

The Leatherman Patent (U.S. Pat. No. 5,913,487) discloses a cable system that organizes multiple wires on spools for controlled release. However, the spools employ spring-loaded tensioners that rotate to un/wind cables thereon as opposed to a stationary helical cone upon which said cable is manually wound and enclosed within a box containing an array of said helical cones.

The Hawthorne Patent (U.S. Pat. No. Des. 376,530) illustrates an ornamenral design for a cord organizer, which fails to teach helical cones that are contained within a box including a lid that encloses the entire organizer.

While the above-described devices fulfill their respective and particular objects and requirements, they do not describe a box that includes an array of helical cones that enable wires and cables to be manually wound or unwound in order to store and organize excess cable or wire length; wherein the box includes slits aligned along a front and rear surface that are adjacent each helical cone; wherein the slits have a curvature that enables a wire or cable to be locked to said surface; wherein the lid includes a plurality of locking tabs for securement atop said box; wherein the lid includes a plurality of openings aligned above the helical cones, which enables viewing therein; wherein the shape of the helical cones enables each wire or cable to be wind therein without slipping or tangling; and wherein the box is placed adjacent a plurality of electrical devices so as to provide a means of storing and organizing a plurality of cables and wires having excess lengths. In this regard, the electrical cord organization box departs from the conventional concepts and designs of the prior art.

SUMMARY OF THE INVENTION

The electrical cord organization box includes a lid that secures atop said box. The box includes an array of helical cones that have a curvature ideal for winding and unwinding cables or wires thereon, which prevents unwanted tangling or slipping. The box includes along the front surface and the rear surface a plurality of slots that are aligned adjacent each helical cone, and which have a curvature that secures the respective wire or cable to the surface of the box. The box is placed adjacent a plurality of electrical devices so as to provide a means to organize and store excess cable or wire lengths associated with the electrical devices.

An object of the invention is to provide a box that can store and organize a plurality of cables and wires adjacent a plurality of electrical devices.

An even further object of the invention is to place said box in between the plurality of electrical devices and electrical outlets used to power said electrical devices.

A further object of the invention is to provide a box that includes a means of securing a wire or cable at a front surface before winding upon a helical cone.

An even further object of the invention is to provide a slot on an opposing side that secures the same wire or cable to the box after being wound upon the helical cone, and prior to being plugged into an electrical outlet or other port.

A further object of the invention is to provide an array of helical cones that involve a no moving parts design, and which enables a wire or cable to be wound or unwound thereon and using a shape that prevents slipping or tangling of said wire or cable thereon.

A further object of the invention is to provide a lid that encloses the box so as to prevent unwanted interference with the storage and organization of the wires and cables container therein.

Another object of the invention is to store and organize excess cable or wire length within the box so as to prevent tangling of said wires behind said devices.

These together with additional objects, features and advantages of the electrical cord organization box will be readily apparent to those of ordinary skill in the art upon reading the following detailed description of presently preferred, but nonetheless illustrative, embodiments of the electrical cord organization box when taken in conjunction with the accompanying drawings.

In this respect, before explaining the current embodiments of the electrical cord organization box in detail, it is to be understood that the electrical cord organization box is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the electrical cord organization box.

It is therefore important that the claims be regarded as including such equivalent construction insofar as they do not depart from the spirit and scope of the electrical cord organization box. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 5 illustrates a perspective view of the electrical cord organization box in use and between a plurality of electrical devices and electrical outlets, and including a cut-away depicting an electrical cord entering a slot of a side of a box before winding about a helical cone and subsequent egress through an adjacent slot of a corresponding side of the box.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
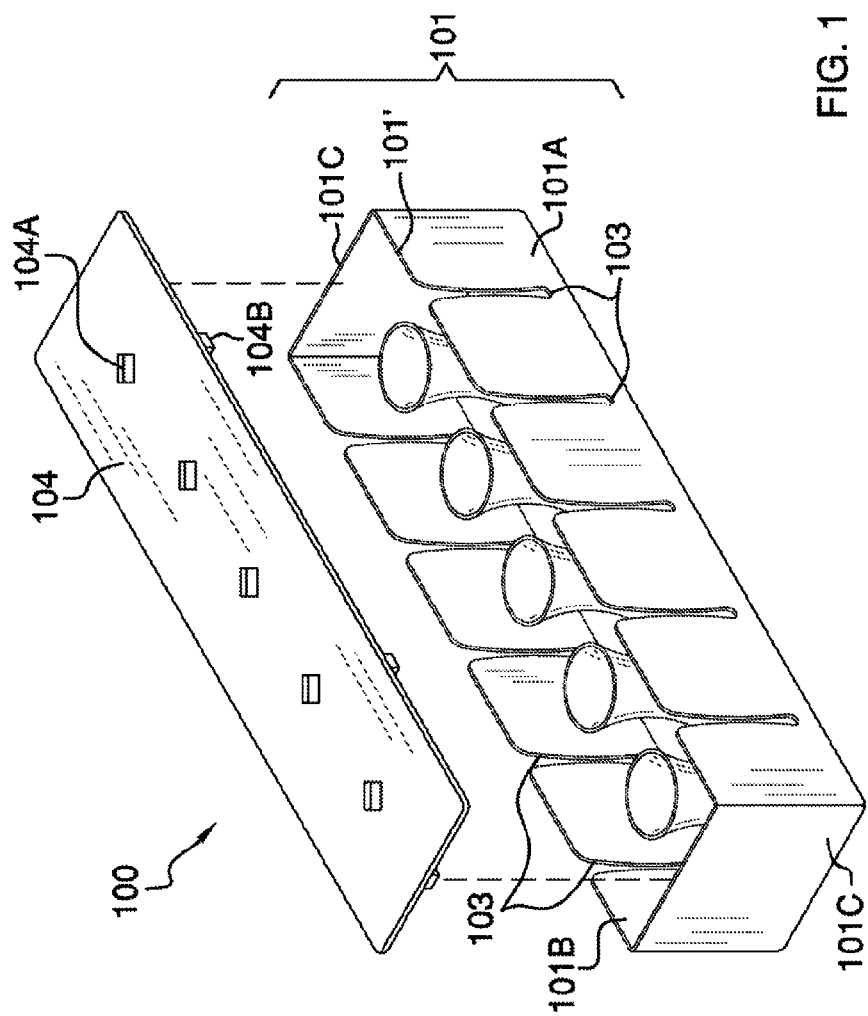
FIG. 1 illustrates a perspective view of the electrical cord organization box with the lid aligned above said box and revealing the array of helical cones contained within said box.
Figure 2:
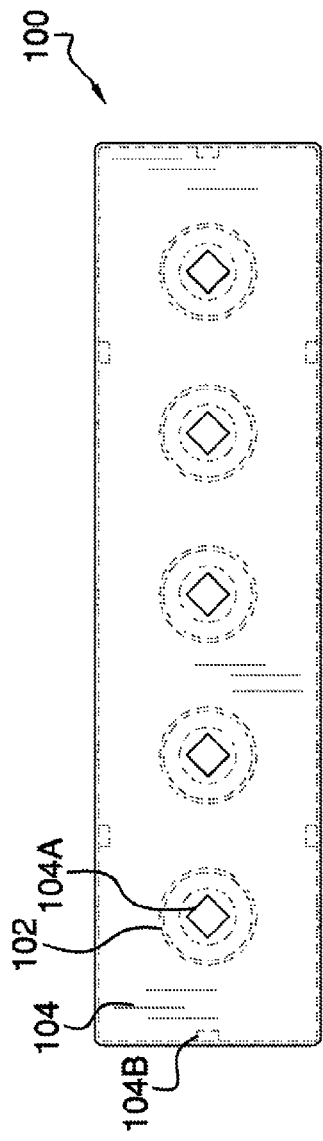
FIG. 2 illustrates a top view of the electrical cord organization box in which the lid is secured atop said box and in which the lid tabs of the lid and the helical cones are depicted in broken lines.
Figure 3:
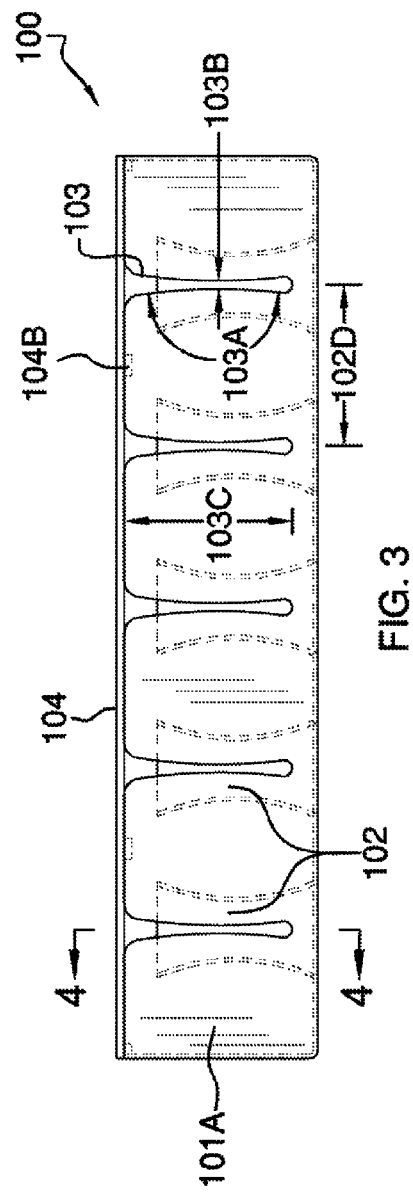
FIG. 3 illustrates a front view of the electrical cord organization box and detailing the slots adorning the front surface, and depicting the helical cones located within the box in broken lines.
Figure 4:
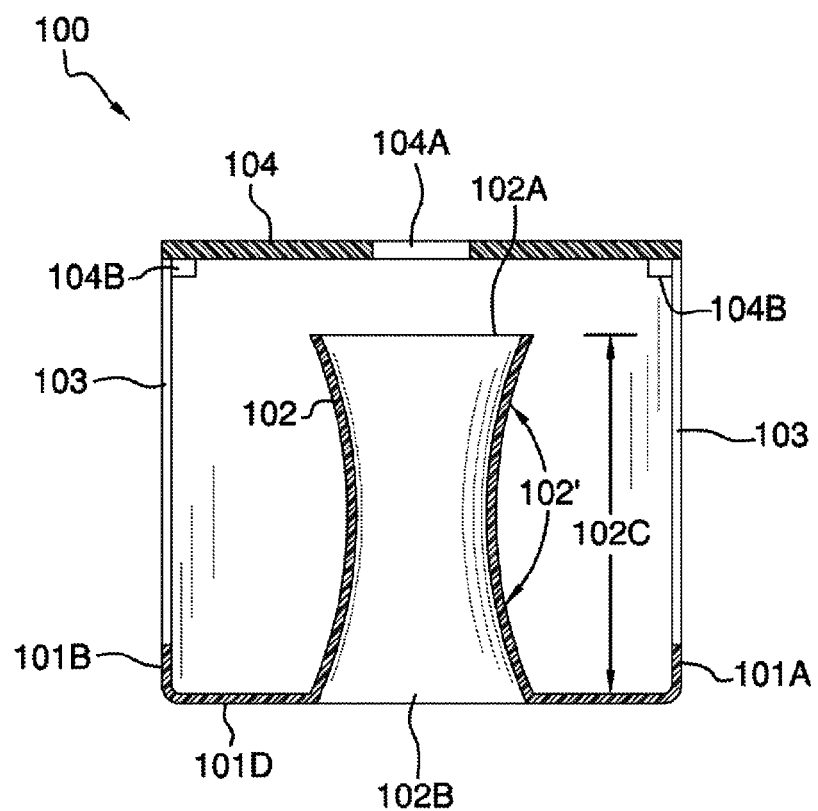
FIG. 4 illustrates a cross-sectional view of the electrical cord organization box along line 4-4 in FIG. 3, and depicting the slots located on the front and rear surface of the box as well as the shape of the helical cones located within said box as well as the lid opening located on the lid.

Detailed reference will now be made to the preferred embodiment of the present invention, examples of which are illustrated in FIGS. 1-5. An electrical cord organization box 100 (hereinafter invention) includes a box 101 defined by a front surface 101A, a rear surface 101B, end surfaces 101C, and a bottom surface 101D.

A plurality of helical cones 102 extend from the bottom surface 101D of the box 101 to form a pattern. It shall be noted that the pattern formed within the box 101 via the helical cones 102 may also be referred to as an array or some other logical arrangement that aids in the use of the invention 100.

The helical cones 102 are arranged within the box 101, and include an open top 102A. Additionally, the helical cones 102 have an open bottom 102B (see FIG. 4). The helical cones 102 have a curved edge 102' that resembles a converging-diverging nozzle, and an overall height 102C, which is less than a height of the box 101. The helical cones 102 are separated by one another by a distance 102D.

The front surface 101A and the rear surface 101B each include a plurality of slots 103. The slots 103 are separated by the distance 102D of separation of the helical cones 102. More importantly, the slots 103 are aligned adjacent the helical cones 102 contained within the box 101. The slots 103 are further defined by an elongated curve 103A that is mirrored throughout, and which forms a slot gap 103B. The slot gap 103B is a purposeful design in that a cable or wire 130 must be pushed down a length 103C, and cross through the slot gap 103B. The slot gap 103B secures the wire or cable 130 to the respective surface of the box 101 and prevents unwanted escape of the cable 130 there from. More particularly, to unsecure the cable 130, the cable 130 must be raised up through the entire length 103C of the slot 103 and out of the box 101. The slots 103 descend from a top edge 101' of the box 101 down the length 103C.

It shall be hereby noted that the term cable or wire is interchangeable and is used to describe a means of transmitting electricity or signals to and from an electronic device 131.

The helical cones 102 are used to wind an undefined length of the cable 130 thereon in order to organize and store said portion of the cable 130 so as to prevent tangling amongst the plurality of cords 130 that are associated to a rear of multiple electronic devices 131.

The invention 100 also includes a lid 104 that is secured atop the box 101, and mote particularly, the lid 104 is secured to the top edge 101' of the box 101. The lid 104 serves to enclose the invention 100 and seal off the coiled portions of the plurality of cables 130 stored within. The lid 104 includes a plurality of openings 104A that are separated by the distance 102D used to separate the helical cones 102. The openings 104A enable an end user to peer into the invention 100 without having to open the invention 100. The lid 104 has an overall shape consistent with the bottom surface 101D of the box 101. The lid 104 is further comprised of a plurality of lid tabs 104B, which aid to secure the lid 104 to the box 101 by engaging an interior surface of either the front surface 101A, the rear surface 101B, or end surfaces 101C (see FIG. 4).

The invention 100 is used by sliding the respective cable 130 down the slot 103 of the front surface 101A or rear surface 101B before winding the unneeded length of the cable 130 around the helical cone 102. Thereafter, the cable 130 shall be placed down the corresponding slot 103 of the rear surface 101B or front surface 101A (respectively), before either plugging into a standard electrical outlet 135 or plugging into another electronic device 130.

The invention 100 shall be made of materials comprising a plastic, wood, metal, ceramic, or carbon fiber composite. The components of the invention 100 shall be of rigid construction and not made of flexible materials.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An electrical cord organization box comprising:
a box into which a plurality of helical cones extends vertically;
wherein the helical cones are linearly aligned inside of said box;
wherein a plurality of cables are adapted to be wound around one of the helical cones in order to organize and store a length of the cable spanning from an electronic device to an electrical outlet or to another electronic device;
wherein the box is further defined by a front surface, a rear surface, end surfaces, and a bottom surface;
wherein the box is further defined by a top edge;
wherein a lid is placed atop the box and has the same shape as the bottom surface;
wherein the front surface and the rear surface include a plurality of slots that are aligned adjacent the helical cones included within the box;
wherein the slots are further defined by an elongated curve that is mirrored throughout, and which forms a slot gap; wherein the slot gap is configured to secure the wire to the box such that the wire does not slip; wherein the slot has a length; wherein the slot extends down from the top edge of the box.

2. The electrical cord organization box as described in claim 1 wherein a distance separates the helical cones from one another; and wherein the distance also separates the slots from one another.

3. The electrical cord organization box as described in claim 2 wherein the lid includes openings that are separated from one another by the distance.

4. The electrical cord organization box as described in claim 1 wherein the plurality of helical cones extend from the bottom surface of the box; wherein the helical cones include an open top and an open bottom; wherein the helical cones have a curved edge, and an overall height that is less than a height of the box.

* * * * *